(12) United States Patent
Krishnamurthy et al.

(10) Patent No.: US 8,493,984 B2
(45) Date of Patent: Jul. 23, 2013

(54) SYSTEM AND METHOD FOR ESTABLISHMENT OF A MULTIPROTOCOL LABEL SWITCHING (MPLS) TUNNEL

(75) Inventors: Chandrasekar Krishnamurthy, Sunnyvale, CA (US); Thomas C. Redman, Richardson, TX (US); Warren Scott Wainner, Sterling, VA (US); Alistair H. Woodman, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 527 days.

(21) Appl. No.: 12/138,908

(22) Filed: Jun. 13, 2008

(65) Prior Publication Data
US 2009/0310614 A1   Dec. 17, 2009

(51) Int. Cl.
*H04L 12/66* (2006.01)
(52) U.S. Cl.
USPC ........... 370/401; 370/252; 709/227; 709/228
(58) Field of Classification Search
CPC ......... H04L 47/70; H04L 47/72; H04L 47/825; H04L 12/66; H04L 12/5695
USPC .................. 370/352, 252, 401; 709/227, 228
See application file for complete search history.

(56) References Cited

U.S. PATENT DOCUMENTS

| | | | |
|---|---|---|---|
| 5,852,601 A * | 12/1998 | Newman et al. | 370/230 |
| 6,408,001 B1 | 6/2002 | Chuah et al. | 370/392 |
| 6,477,166 B1 | 11/2002 | Sanzi et al. | 370/395.1 |
| 6,665,273 B1 | 12/2003 | Goguen et al. | 370/252 |
| 6,678,264 B1 * | 1/2004 | Gibson | 370/352 |
| 6,714,987 B1 * | 3/2004 | Amin et al. | 709/249 |
| 6,775,239 B1 | 8/2004 | Akita et al. | 370/248 |
| 6,778,494 B1 | 8/2004 | Mauger | 370/230 |
| 6,856,991 B1 | 2/2005 | Srivastava | 707/10 |

(Continued)

FOREIGN PATENT DOCUMENTS

| | | |
|---|---|---|
| CN | 1898917 | 1/2007 |
| EP | 1 441 476 A2 | 7/2004 |
| EP | 1816789 A1 | 8/2007 |
| WO | 2007/137765 A1 | 12/2007 |

OTHER PUBLICATIONS

Young-Chul Jun, Jong-Chul Seo, and Young-Tak Kim, "Session & Connection Managment with SIP and RSVP-TE for QoS-guaranteed Multimedia Service Provisioning", May 23, 2005, pp. 202-213.*

(Continued)

*Primary Examiner* — Ayaz Sheikh
*Assistant Examiner* — Tarell Hampton
(74) *Attorney, Agent, or Firm* — Baker Botts L.L.P.

(57) ABSTRACT

In one embodiment, a method for receiving a request from a first interface to establish a session with at least a second interface in a communication network is provided. The request is transmitted to an application layer signaling device via an application layer signaling protocol dialog, wherein the application layer signaling protocol dialog is configured to facilitate communication between the first interface and the application layer signaling device. The method further includes communicating parameters for establishing a session tunnel to a first edge router via the application layer signaling protocol dialog, wherein the first edge router is configured to dynamically establish the session tunnel between the first edge router and at least a second edge router, wherein the second edge router is positioned proximate to the at least second interface in the communication network.

18 Claims, 2 Drawing Sheets

U.S. PATENT DOCUMENTS

| | | | |
|---|---|---|---|
| 6,925,081 B2 | 8/2005 | Meda | 370/392 |
| 6,980,526 B2 | 12/2005 | Jang et al. | 370/260 |
| 7,079,544 B2 | 7/2006 | Wakayama et al. | 370/401 |
| 7,093,160 B2 | 8/2006 | Lau et al. | 714/11 |
| 7,272,146 B2 | 9/2007 | Yamauchi | 370/395.53 |
| 7,315,510 B1 | 1/2008 | Owens et al. | 370/218 |
| 8,155,116 B2 | 4/2012 | Eriksson et al. | |
| 2002/0126201 A1* | 9/2002 | Schmitt et al. | 348/14.09 |
| 2002/0181462 A1* | 12/2002 | Surdila et al. | 370/392 |
| 2003/0118028 A1 | 6/2003 | Neal et al. | 370/395.21 |
| 2004/0081203 A1* | 4/2004 | Sodder et al. | 370/469 |
| 2004/0153551 A1* | 8/2004 | Haumont | 709/228 |
| 2005/0041808 A1* | 2/2005 | He | 380/248 |
| 2005/0232231 A1* | 10/2005 | Miyabe | 370/351 |
| 2006/0114889 A1* | 6/2006 | Schneider et al. | 370/352 |
| 2006/0215578 A1* | 9/2006 | Andrapalliyal et al. | 370/254 |
| 2007/0019545 A1* | 1/2007 | Alt et al. | 370/230 |
| 2007/0115913 A1* | 5/2007 | Li et al. | 370/349 |
| 2007/0150946 A1* | 6/2007 | Hanberger et al. | 726/15 |
| 2007/0209058 A1* | 9/2007 | Anantharamiah et al. | 726/1 |
| 2007/0213060 A1 | 9/2007 | Shaheen | 455/436 |
| 2007/0258456 A1 | 11/2007 | Khouderchah et al. | 370/392 |
| 2008/0144615 A1* | 6/2008 | Casey | 370/389 |
| 2008/0285463 A1* | 11/2008 | Oran | 370/241 |
| 2008/0298370 A1* | 12/2008 | Yoshimoto et al. | 370/395.31 |

OTHER PUBLICATIONS

H. Schulzrinne, et al.; *Real Time Streaming Protocol (RTSP)*; http://www.ietf.org/rfc/rfc2326.txt; 86 pages, Apr. 1998.

M. Handley, et al.; *SDP: Session Description Protocol*; http://www.ietf.org/rfc/rfc2327.txt; 40 pages, Apr. 1998.

D. Awduche, et al.; *RSVP-TE: Extensions to RSVP for LSP Tunnels*; http://www.ietf.org/rfc/rfc3209.txt; 57 pages, Dec. 2001.

J. Rosenberg, et al.; *SIP: Session Initiation Protocol*; http://www.ietf.org/rfc/rfc3261.txt; 252 pages, Jun. 2002.

G. Camarillo, et al.; *Integration of Resource Management and Session Initiation Protocol (SIP)*; http://www.ietf.org/rfc/rfc3312.txt; 29 pages, Oct. 2002.

Dave Ward, et al.; *MPLS Architectural Considerations for a Transport Profile*; 115 pages, Apr. 18, 2008.

International Engineering Consortium; *Multiprotocol Label Switching (MPLS)*; 2 pages, accessed Jun. 13, 2008.

*MPLS-RC; The MPLS-VPLS Resource Center*; 2 pages, accessed Jun. 13, 2008.

International Search report and Written Opinion; PCT/US2009/046672; pp. 7, Date of Mailing: Jul. 29, 2009.

Extended European Search Report, Application No. 09763407.5, 5 pages, Apr. 15, 2011.

European Office Action; Application No. 09 763 407.5-1249; pp. 4, Sep. 4, 2012.

The First Office Action of the State Intellectual Property Office of the People's Republic of China; Application No. 200980121911; pp. 15, Dec. 4, 2012.

\* cited by examiner

SYSTEM AND METHOD FOR ESTABLISHMENT OF A MULTIPROTOCOL LABEL SWITCHING (MPLS) TUNNEL

TECHNICAL FIELD OF THE INVENTION

The present disclosure relates in general to the field of network communications and, more particularly, to a system and method for establishing and initializing of an MPLS tunnel.

BACKGROUND OF THE INVENTION

Networking architectures have grown increasingly complex in telecommunications environments. The ever-increasing need to communicate in and across various network environments has caused many networking systems to respond by adding enhancements to accommodate the increase in networking traffic and to accommodate various types of network traffic.

MPLS networks may provide unified data-carrying service for both circuit-based and packet-switching end users. Packet-switching services require that the MPLS network offer very specific treatment to the packets which belong to a specific Application Session. The specific treatment may be specified in terms of bandwidth, latency, jitter, probability of losing a data packet, etc. In some cases, network operators may employ packet networks in which application layer signaling devices, such as session border controllers (SBCs), function as an overlay network, with no explicit coordination with the operation of the packet routers in the network. SBCs control the signaling and the data streams involved in establishing, conducting, and terminating a call session within a communication network. Each session may include one or more call signaling streams to control the call and one or more call media streams to carry the call's audio, video, or other related data. SBCs generally use media relays in order to provide virtual private network interconnect, network address translation traversal, topology hiding, and other known functionalities. SBCs may be inserted into the signaling and media streams between the originating and the receiving parties in a call session so that the SBC may control the signaling traffic and the media traffic of the session. Routers, within an MPLS network, serve as entry and exit points to the network. The router may be a label edge router (LER), which may be configured to push a label on an incoming data packet and pop off a label of an outgoing data packet. In another embodiment, the label edge router may be coupled to an intermediate-level router, referred to as a label switch router (LSR). The LSR may be configured to perform routing of the data packet based on the label associated with the data packet.

The traffic engineering extension of MPLS, known as MPLS-TE, generally allows the establishment of MPLS tunnels, taking into consideration the network constraints and requirements. MPLS-TE includes certain functionality configured to dynamically adapt to the requirements of an application once a call session is already established. In a general application, MPLS-TE provides guaranteed bandwidth and general network performance management to the end user of the network. However, MPLS-TE does not provide for an application to dynamically establish and manage an MPLS tunnel. Accordingly, the ability to provide an effective system and method to i) dynamically establish an MPLS tunnel, ii) manage the tunnel's performance and associated resources, iii) dynamically dimension the tunnel according to the needs of an application, and iv) terminate the MPLS tunnel upon conclusion by an application offers a significant challenge to a communication network.

SUMMARY OF THE INVENTION

In one embodiment, a method for receiving a request from a first interface to establish a session with at least a second interface in a communication network is provided. The request is transmitted to an application layer signaling device via an application layer signaling protocol dialog, wherein the application layer signaling protocol dialog is configured to facilitate communication between the first interface and the application layer signaling device. The method further includes communicating parameters for establishing a session tunnel to a first edge router via the application layer signaling protocol dialog, wherein the first edge router is configured to dynamically establish the session tunnel between the first edge router and at least a second edge router, wherein the second edge router is positioned proximate to the at least second interface in the communication network.

In another embodiment, a system including an application layer signaling device is provided. The system includes an application layer signaling device configured to receive a request from an interface to establish a session between a first endpoint and a second endpoint in a communication network. The application layer signaling device is provisioned with an application layer signaling protocol dialog to facilitate communication between the application layer signaling device and the interface. The application layer signaling device is configured to be coupled to a first routing device, such that the application layer signaling device is configured to provide parameters to the first routing device to dynamically establish a session tunnel with a second routing device positioned proximate to the second endpoint.

In one embodiment, a system including means for receiving a request from a first interface to establish a session with at least a second interface in a communication network is provided. The request is transmitted to an application layer signaling device via an application layer signaling protocol dialog, wherein the application layer signaling protocol dialog is configured to facilitate communication between the first interface and the application layer signaling device. The system furthers includes means for communicating parameters for establishing a session tunnel to a first edge router via the application layer signaling protocol dialog, wherein the first edge router is configured to dynamically establish the session tunnel between the first edge router and at least a second edge router, wherein the second edge router is positioned proximate to the at least second interface in the communication network.

DETAILED DESCRIPTION OF THE INVENTION

Figure 1:
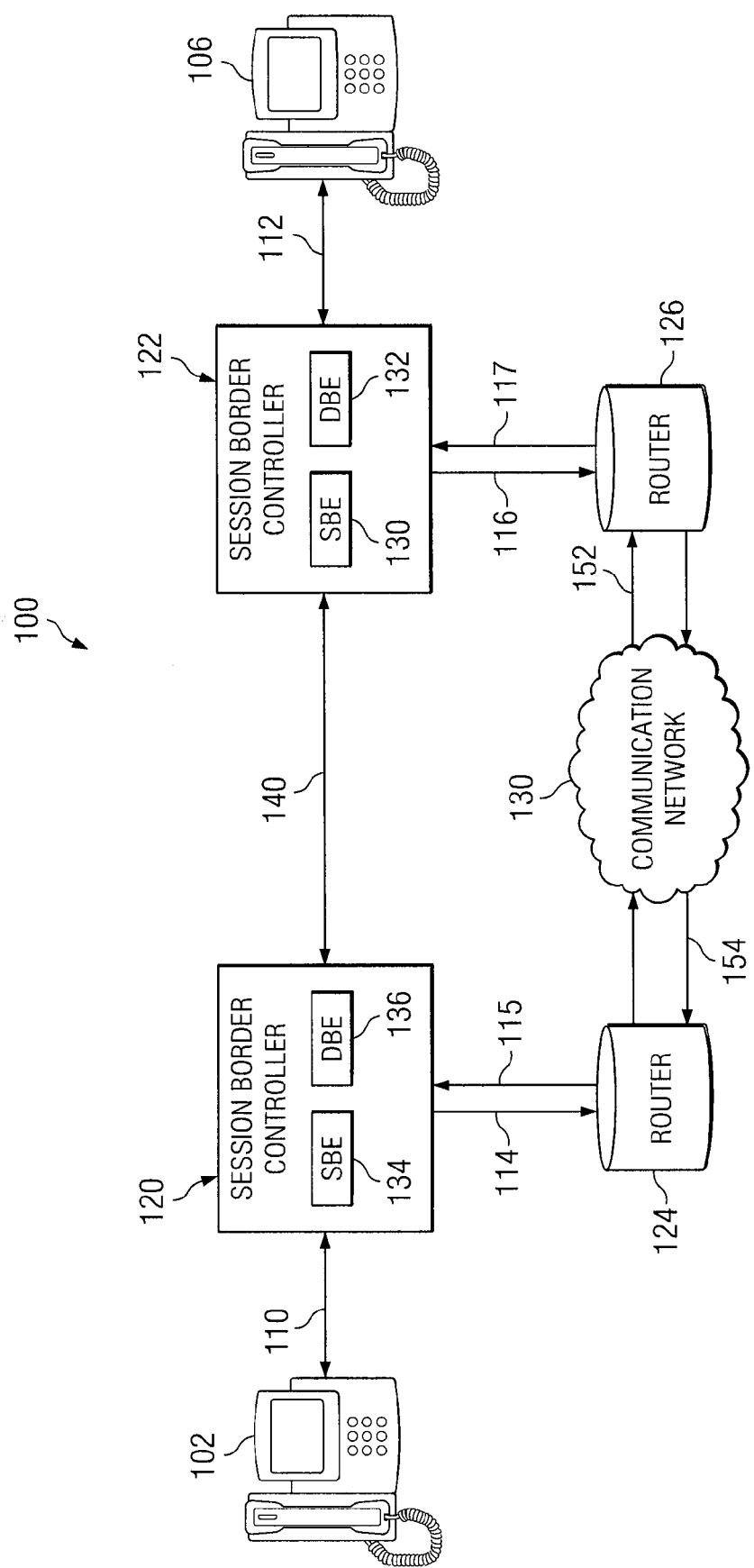
FIG. 1 illustrates a block diagram of a communications system for optimizing communications between elements of a network environment.

FIG. 1 is a simplified block diagram of communications system 100 for optimizing communications from network endpoints to various elements within a communication network environment. Communications system 100 may include a number of IP session terminal devices or interfaces (102, 106) and a set of communication links 110, 112. Interfaces (102, 106) are preferably positioned as endpoints of communications system 100. Communications system 100 may also include a pair of session border controllers 120, 122, which control the signaling and the data streams involved in a call session. Communications system 100 may also include a pair of routers (124, 126), wherein at least one router is coupled to each of the SBCs (120, 122) by sets of communication links 114, 115, 116, 117. SBCs 120, 122 may be configured to be hosted either as a part of routers 124, 126 (e.g., the service on a stick model) or may be externally coupled to routers 124, 126, such as by wired or wireless implementation. SBCs (120, 122) and routers (124, 126) may communicate using a well-known protocol technology via a physical interface or a logical interprocess communication mechanism.

Communications system 100 provides the ability for interfaces (102, 106) to communicate via SBCs 120, 122 through communication network 130. Communication network 130 may be configured as a local or global communication network, such as the Internet or any other suitable communication network. In one embodiment, SBCs 120, 122 are configured as application layer signaling devices, working in conjunction with routers 124, 126, such as MPLS PE routers, to control network traffic between endpoints. SBCs generally may be inserted into the signaling and media streams between the originating endpoint and the receiving endpoint so that the SBC may control the signaling traffic and the media traffic of the session.

Interfaces (102, 106) each represent an end user, a client, or a customer wishing to initiate communication or participate in a call session via communications system 100. Interfaces (102, 106) may be inclusive of devices used to initiate or participate in the call session, such as a telephone, a video phone system, a computer, a handheld or mobile device, a laptop computer, a personal computer (PC)-based video phone, a streaming client, an SIP-enabled telephone of any kind, or any other device, component, element, or object capable of initiating voice, video, or data exchanges within communications system 100. Interfaces (102, 106) may also be inclusive of a suitable interface to the human user, such as a microphone, a display, a keyboard, a whiteboard, a video-conferencing interface or bridge, or other terminal equipment.

Interfaces (102, 106) may also be any device that seeks to initiate or participate in the call session on behalf of another entity or element, such as another end user, a program, a database, an application, a piece of software, or any other component, device, element, or object capable of initiating a voice, a video, or a data exchange within communications system 100. Data, as used herein in this document, refers to any type of alphanumeric, voice/audio, video, audio-visual, or script data, any type of source or object code, or any other suitable information in any appropriate format that may be communicated from one interface to another.

In one embodiment, interfaces (102, 106) may also be any device that seeks to initiate or participate in the call session on behalf of another entity or element. Particularly, interfaces (102, 106) may be configured to include an output display, one or more knobs, pushbuttons, tactile user inputs, which facilitate controlling various interface functions. Interfaces (102, 106) may be configured to display data related to establishing, conducting, and terminating a call session within a communication network. In one exemplary embodiment, the output display of interfaces (102, 106) may be a touch screen display, while in other exemplary embodiments, may be any other display technology type (e.g., LCD, DLP, plasma, CRT) or configuration. The knobs, pushbuttons, or tactile user inputs may be configured to establish of manage a call session.

In particular embodiments, interfaces (102, 106), session border controllers (120, 122), and routers (124, 126) may be configured to transmit and receive a data requests and/or electrical signals via a wired or wireless medium. In one embodiment, interfaces (102, 106) may be configured to establish a call session via a wired communication link. In another embodiment, interfaces (102, 106) may be configured to establish a wireless communication link such as via a wireless communications protocol, such as an IEEE 802.11 protocol, an IEEE 802.16 protocol, IEEE 802.20 protocol, a Bluetooth communications protocol, a mobile device signal, an RF signal, an infrared signal, or any other suitable wireless technology.

Routers (124, 126) are configured to route data packets within communications system 100. In one embodiment, routers (124, 126) may be configured as label edge routers (LER), which are configured to push a label on an incoming data packet and pop off a label of an outgoing data packet. Particularly, when transmitting data packets in communications system 100, routers (124, 126) use routing information to determine appropriate labels to be affixed and label the data packet accordingly to be tranmitted within the communication network. Also, upon receiving a labelled data packet that is addressed to exit the network, routers (124, 126) are configured to remove the appropriate label and forward the resulting data packet. In another embodiment, router (124, 126) may also include label switch routers (LSR), which are configured to switch the labels on the data packets, in order to perform the routing of the data packets based on the label associated with the data packet. The LSRs are configured such that when an LSR receives a data packet, the LSR may use the label in the data packet header to determine the next hop on the path of the data packet and a corresponding label for the data packet from a look-up table. The previous label is then removed from the header and replaced with a new label before the packet is routed forward in the data path.

Communication links (110, 112) represent a set of local communication networks (i.e., a local area network within a corporation) in one embodiment. Communication links (110, 112) may serve one or more individuals and, further, offer connectivity to any number of devices in the call session (e.g. telephones, video conference systems, handheld or mobile devices, desktop and laptop computers, etc.). Communication links (110, 112) are configured to be coupled to SBCs 120, 122 of communications system 100. In other embodiments, communication links (110, 112) may be configured as virtual private networks (VPNs), wireless LANs (WLANs), metropolitan area networks (MANs), wide area networks (WANs), or any other suitable architecture that offers connectivity to a group of end users.

SBCs 120 and 122 are configured to facilitate communications via communication links (110, 112) and control interfaces (114, 115, 116, 117). SBCs are control devices used to control the signaling and the data streams involved in establishing, conducting, and terminating a call session within a communication network. In one embodiment, each SBC may be configured to include a signaling path border element (SBE) (130, 134) and a data path border element (DBE) (132, 136). However, either or both of these elements may be provided external to SBCs 120 and 122. The configuration of the SBC may be reflective of accommodations being made for a particular type of communications protocol or plan, a distributed architecture, or based on selected performance or service parameters. SBCs (120, 122) may be configured to facilitate network communication with a segmented QoS resource reservation type known as a middle segment resource reservation. The middle segment resource reservation type assist in avoiding an overload of the endpoint-to-endpoint or "e2e" resource reservation type. The middle segment reservation type indicates that the reservation may be installed on a segment of a communication network that is under the scope of control of two corresponding application layer devices, such as two corresponding SBCs that are involved in a protocol dialog. Conversely, an endpoint-to-endpoint resource reservation type indicates that the reservation spans the entire network between two end-systems. The middle segment reservation type provides the capability to require a reservation on some specific subset of the network that is not a local or endpoint-to-endpoint connection.

Control interfaces (114, 115, 116, 117) are configured to be coupled to session border controllers (120, 122) and routers (124, 126). Control Interfaces (114, 115, 116, 117) are configured for session border controllers (120, 122) to exert control over certain features of routers (124, 126). In one embodiment, control interfaces (114, 115, 116, 117) may be configured to create, dimension, manage, and terminate session tunnels (152, 154), such as MPLS TE tunnels, between session border controllers (120, 122) and routers (124, 126). The creation, dimensioning, management, and termination of the session tunnels is performed based on events or conditions which are discerned by session border controllers (120, 122). Signaling interface (140) is configured to be coupled between SBCs (120, 122), therefore allowing the SBCs to exchange application layer signaling.

Figure 2:
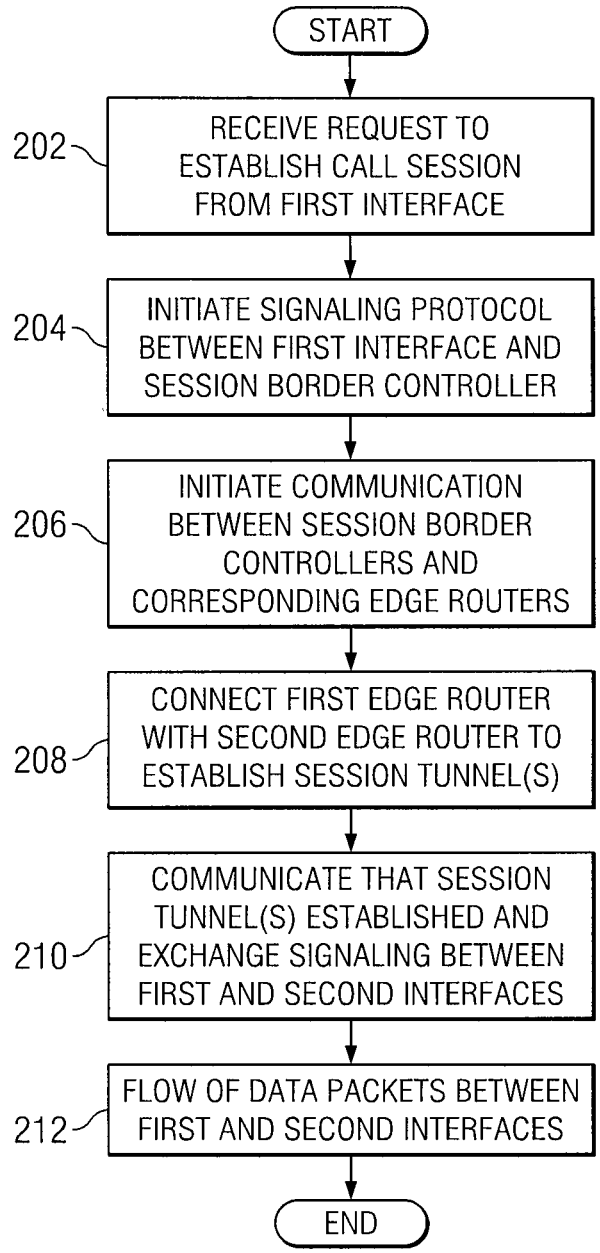
FIG. 2 illustrates a flowchart of an example method of dynamically establishing a session tunnel.

FIG. 2 illustrates a general example method of dynamically establishing a session tunnel. At step 202, a session border controller receives a request from a first interface to establish a call session. When the call session is initiated by the first interface, a signaling protocol dialog, such as Session Initiation Protocol (SIP), may be initiated using a signaling protocol between the first interface and the session border controller (step 204). At step 204, the middle-segment QoS is signaled between SBCs 120 and 122. As the signaling protocol dialog proceeds, the SBCs are configured to initiate communication with its corresponding edge router (step 206) via control interface 115, which is coupled to the SBC. The SBC is configured to include a set of stored application layer routing policies, such as access and interpret routing policies, for establishing a session tunnel on behalf of the interface (i.e., telephone, video phone, mobile device, etc.). The routing policies, which are accessible by the SBC, determine the communication resource requirements between the SBC and the first edge router and also communications across the middle segment (i.e., between the first edge router and the second edge router). The routing policies provision the SBC to determine the necessity of dynamically establishing a session tunnel on behalf of the interfaces positioned at the endpoints of the network. The middle segment resource reservation type assist in avoiding unduly overloading the semantics of the end-to-end QoS semantics by limiting the reservation to a specific subset of the network, the middle segment. At step 208, the first edge router is connected with a second edge router in order to establish at least one session tunnel 152 (shown in FIG. 1), wherein the second edge router is positioned proximate to at least a second interface. The second interface may be configured to connect with the first interface via a second SBC and a router, as shown in FIG. 1. In the embodiment wherein session tunnel 152 is uni-directional and the application session is bi-directional, uni-directional session tunnel 154 is established from the second edge router. At step 210, the routers communicate that the session tunnel(s) were dynamically established and exchange signaling over the communication network. At step 212, data packets flow between the first and second interface via SBCs and routers over the session tunnel(s) of the communication network.

Upon establishing session tunnel(s) (152 and 154), the dimensions of the session tunnel(s) may be specified based on the request of the first interface. The session tunnel(s) may be configured to be dynamically dimensioned with the desired bandwidth and other performance requirements, as needed during the call session. Further, the session tunnel(s) may be configured to be dynamically terminated upon release of the resources by the first and at least second interfaces. The SBC is configured to exert granular and deterministic control over the media transmitted over the session tunnel, thereby enabling a secure, deterministic, and manageable high-bandwidth call session tunnel.

In another embodiment, the signaling protocol dialog may be a protocol such as Real-Time Streaming Protocol (RTSP). In particular embodiments, RTSP may be used to support a streaming video implementation. Routing policies and support for the signaling protocol may be updated at the level of the SBC; however, the method for establishing the session tunnel may be similar to an embodiment using SIP protocol.

Session Description Protocol (SDP) is a format generally used for characterizing streaming media initialization parameters. SDP is typically used by application layer signaling protocols (of interfaces 102, 106 and SBCs 120, 122) to provide details about the media being conveyed during a call session and in order to establish the Quality of Service (QoS) pre-conditions which must be satisfied for the media to be successfully transmitted. Particularly, SBCs (120, 122) may be configured to create an on-demand QoS engineered session tunnel upon receiving a request to establish a call session via interfaces (102, 106). Communications system 100 is configured to use SDP to indicate that a session tunnel is required between two endpoints and to convey the necessary information to establish the session tunnel. Multiple application layer signaling protocols may inherit the functionality of SDP to convey the necessary media parameters for the session tunnel. For example, these application layer signaling protocols may include SIP and RTSP.

For SIP signaling, SDP may be transported within the message body of the SIP signaling message. For example, one embodiment of a conventional SDP message body, with QoS pre-conditions, may include the following:

v=0
    o=UserB 2890844527 2890844527 IN IP4 there.com
    s=Session SDP
    c=IN IP4 110.111.112.113
    t=0 0
    m=audio 3456 RTP/AVP 0
    a=rtpmap:0 PCMU/8000
    a=curr:qos e2e none
    a=des:qos mandatory e2e sendrecv
    a=conf:qos e2e recv However, in certain embodiments, a conventional SDP message body may not include the necessary parameters to establish and dimension a pair of uni-directional session tunnels, such as MPLS-TE tunnels. Therefore, communications system 100 is configured to include the SDP attributes in the message body for establishing the MPLS tunnel and for conveying the necessary media parameters for dimensioning the tunnel. Particularly, one embodiment of a message body may be configured to include one or more of the following SDP attributes for establishing and dimensioning an MPLS tunnel:

i. Qos_tech: The "Qos_tech" attribute describes the specific Quality of Service (QoS) technology which must be used to guarantee the requested network performance. In one embodiment, the value of "Qos_tech," which will indicate that an MPLS TE tunnel is to be established, may be denoted as "mpls_te."
ii. Local_Tunnel_source: The "Local_Tunnel_source" attribute provides the IP Address of the interface, on which the MPLS tunnel will be built, to accommodate Forward Direction traffic in the MPLS tunnel. In one embodiment, the value of "Local_Tunnel_source" may be denoted as "ipv4 a.b.c.d" wherein the "a.b.c.d" is the ipv4 address in dotted decimal notation. Forward Direction is from the perspective of the originator of the call session. For example, in a bi-directional call session between caller A and caller B, when caller A is generating an SDP to send to caller B, then caller A's concept of "Forward Direction" would be traffic traveling from caller A towards caller B.
iii. Local_Tunnel_dest: The "Local_Tunnel_dest" attribute provides the IP Address of the interface, on which the MPLS tunnel will be built to accommodate Reverse Direction traffic in the MPLS tunnel. In one embodiment, the value of "Local_Tunnel_dest" is "ipv4 a.b.c.d", wherein the "a.b.c.d" is the ipv4 address in dotted decimal notation. Reverse Direction is from the perspective of the originator of the call session. For example, in a bi-directional call session between caller A and caller B, when caller A is generating an SDP to send to caller B, then caller A's concept of "Reverse Direction" would be traffic traveling from caller B towards caller A
iv. Forward Tunnel ID: The "Forward Tunnel ID" attribute is the tunnel ID of the Forward Direction MPLS-TE tunnel.
v. Forward Filter-spec: The "Forward Filter-spec" attribute specifies the Forward Direction traffic which may be admitted to the tunnel. The format for this filter spec would be that of an extended access list.
vi. Reverse Filter-spec: The "Reverse Filter-spec" specifies the Reverse Direction traffic which may be admitted to the tunnel. The format for this filter spec would be that of an extended access list.

Communications system 100 may be configured to include the SDP attributes and the SDP status-type parameter indicative of communicating over the middle segment resource reservation type. In one embodiment, the value for the SDP status-type parameter may be denoted as "middle_segment". The "middle_segment" status-type parameter is configured to indicate that the reservation type is to be applicable to a network segment under the scope of control of two corresponding application layer devices involved in a protocol dialog. For example, one embodiment of an SDP message body, with the new parameters, may include the following:

v=0
o=UserB 2890844527 2890844527 IN IP4 there.com
s=Session SDP
c=IN IP4 110.111.112.113
t=0 0
m=audio 3456 RTP/AVP 0
a=rtpmap:0 PCMU/8000
a=curr:qos middle_segment none
a=des:qos mandatory middle_segment sendrecv
a=conf:qos middle_segment recv
a=qos_tech mpls_te
a=Local Tunnel_source ipv4 10.1.1.1
a=Local Tunnel_dest ipv4 11.2.2.2
a=Source Tunnel ID xyz
a=Forward Filter-spec { . . . }
a=Reverse Filter-spec { . . . }

As the session tunnel is established, the dimensions of the session tunnel may be specified based on the request of the first interface. The session tunnel is configured to be dynamically dimensioned with the desired parameters, as needed during the call session. Particularly, as the session call proceeds, the SDP parameters conveyed between the corresponding interfaces (102, 106) provide the necessary media parameters to dynamically establish the session tunnel.

While exemplary embodiments are illustrated in the Figures and described above, it should be understood that these embodiments are offered by way of example only. Accordingly, the present innovation is not limited to a particular embodiment, but extends to various modifications that nevertheless fall within the scope of the appended claims. The order or sequence of any processes or method steps may be varied or re-sequenced according to alternative embodiments.

Describing the innovation with Figures should not be construed as imposing on the invention any limitations that may be present in the Figures. The present innovation contemplates methods, systems and program products on any machine readable media for accomplishing its operations. The embodiments of the present innovation may be implemented using an existing computer processors, or by a special purpose computer processor for an appropriate system, incorporated for this or another purpose or by a hardwired system.

As noted above, embodiments within the scope of the present innovation include program products comprising machine-readable media for carrying or having machine-executable instructions or data structures stored thereon. Such machine readable media an be any available media which can be accessed by a general purpose or special purpose computer or other machine with a processor.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the invention. Likewise, software implementations of the present innovation could be accomplished with standard programming techniques with rule based logic and other logic to accomplish the various connection steps, processing steps, comparison steps and decision steps.

The foregoing description of embodiments of the innovation has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the innovation and its practical application to enable one skilled in the art to utilize the innovation in various embodiments and with various modifications as are suited to the particular use contemplated.

What is claimed is:

1. A method comprising:
receiving a request from a first interface to establish a session with at least a second interface in a communication network, the request being transmitted to an application layer signaling device via an application layer signaling protocol dialog, wherein the application layer signaling protocol dialog is configured to facilitate communication between the first interface and the application layer signaling device; and communicating parameters for establishing a session tunnel in a label switching network from the application layer signaling device to a first edge router of the label switching network via the application layer signaling protocol dialog, wherein the parameters of the session tunnel are determined based on the request received by the application layer signaling device from the first interface, and wherein the first edge router is operable to dynamically establish the session tunnel between the first edge router and at least a second edge router of the label switching network based on the communicated parameters, the session tunnel enabling communication between the first and second interfaces via the first and second edge routers, wherein the first and second edge routers are label edge routers and wherein the session tunnel comprises a multiprotocol label switching tunnel and only exists between the first and second edge routers.

2. The method of claim 1, further including the step of identifying the at least second edge router in the communication network to facilitate establishing the session tunnel with the first edge router.

3. The method of claim 1, furthering including the step of terminating the session tunnel upon conclusion of the session.

4. The method of claim 1, wherein the parameters comprise: tunnel bandwidth and time length of the session.

5. The method of claim 1, wherein the parameters comprise: local tunnel source, local tunnel destination, tunnel identification, forward filter specification, or reverse filter specification.

6. The method of claim 1, wherein the session tunnel is provisioned to support at least one pair of uni-directional session tunnels to facilitate forward and reverse direction communication between the first and second edge routers.

7. The method of claim 1, wherein the signaling protocol comprises Session Initiation Protocol or Real-Time Streaming Protocol.

8. The method of claim 1, wherein the session comprises a video conference call.

9. A system comprising: an application layer signaling device configured to receive a request from a first interface to establish a session with at least a second interface in a communication network, the request being transmitted to an application layer signaling device via an application layer signaling protocol dialog, wherein the application layer signaling protocol dialog is configured to facilitate communication between the first interface and the application layer signaling device, and wherein the application layer signaling device is configured to communicate parameters for establishing a session tunnel in a label switching network to a first edge router of the label switching network via the application layer signaling protocol dialog, the parameters of the session tunnel being determined based on the request received by the application layer signaling device from the first interface, and wherein the first edge router is operable to dynamically establish the session tunnel between the first edge router and at least a second edge router of the label switching network based on the communicated parameters, the tunnel enabling communications between the first and second interfaces via the first and second edge routers, wherein the first and second edge routers are label edge routers and wherein the session tunnel comprises a multiprotocol label switching tunnel and only exists between the first and second edge routers.

10. The system of claim 9, wherein the application layer signaling protocol dialog is configured to provide an internet protocol (IP) address of the interface, in order to manage data traffic in the session tunnel.

11. The system of claim 9, wherein the application layer signaling protocol dialog is configured to provide a tunnel identification parameter representative of a forward direction of the session tunnel.

12. The system of claim 9, wherein the parameters comprise: tunnel bandwidth and time length of the session.

13. The system of claim 9, wherein the parameters comprise: local tunnel source, local tunnel destination, tunnel identification, forward filter specification, or reverse filter specification.

14. The system of claim 9, wherein the session tunnel is provisioned to support at least one pair of uni-directional session tunnels to facilitate forward and reverse direction communication between the first and second edge routers.

15. The system of claim 9, wherein the session comprises a video conference call.

16. A system comprising:
means for receiving a request from a first interface to establish a session with at least a second interface in a communication network, the request being transmitted to an application layer signaling device via an application layer signaling protocol dialog, wherein the application layer signaling protocol dialog is configured to facilitate communication between the first interface and the application layer signaling device; and
means for communicating parameters for establishing a session tunnel in a label switching network to a first edge router of the label switching network via the application layer signaling protocol dialog, wherein the parameters of the session tunnel are determined based on the request received by the application layer signaling device from the first interface, and wherein the first edge router is operable to dynamically establish the session tunnel between the first edge router and at least a second edge router of the label switching network based on the communicated parameters, the tunnel enabling communications between the first and second interfaces via the first and second edge routers, wherein the first and second edge routers are label edge routers and wherein the session tunnel comprises a multiprotocol label switching tunnel and only exists between the first and second edge routers.

17. The system of claim 16, wherein the parameters comprise tunnel bandwidth and time length of the session.

18. The system of claim 16, wherein the session tunnel is provisioned to support at least one pair of uni-directional session tunnels to facilitate forward and reverse direction communication between the first and second edge routers.

* * * * *